United States Patent [19]

McBain et al.

[11] Patent Number: 5,362,819
[45] Date of Patent: Nov. 8, 1994

[54] POLYESTER-FLEXIBLE POLYMER BLOCK COPOLYMERS AND MIXTURES THEREOF

[75] Inventors: Douglas S. McBain, Norton, Ohio; Andrew L. Ratermann, Indianapolis, Ind.; I. Glen Hargis, Tallmadge, Ohio; Earl G. Melby, Uniontown, Ohio; Kevin P. LaJudice, Akron, Ohio

[73] Assignee: GenCorp Inc., Fairlawn, Ohio

[21] Appl. No.: 828,080

[22] Filed: Jan. 30, 1992

[51] Int. Cl.$^5$ .................. C08G 81/00; C08G 63/91
[52] U.S. Cl. .......................... 525/404; 525/43; 525/44; 525/48; 525/408; 525/437; 525/440; 525/444; 525/445; 525/531
[58] Field of Search .............. 525/444, 404, 408, 437, 525/440, 445, 43, 44, 48, 531

[56] References Cited

U.S. PATENT DOCUMENTS

| | | |
|---|---|---|
| 2,750,314 | 6/1956 | Bemmels . |
| 2,829,131 | 4/1958 | Greenspan et al. . |
| 2,838,478 | 6/1958 | Hillyer et al. . |
| 3,119,711 | 1/1964 | Starmann . |
| 3,429,951 | 2/1969 | Childers . |
| 3,437,517 | 4/1969 | Eilerman . |
| 3,538,043 | 11/1970 | Herold . |
| 3,555,112 | 1/1971 | Winkler . |
| 3,651,014 | 3/1972 | Witsiepe .................. 528/308 |
| 3,718,714 | 2/1973 | Comstock . |

(List continued on next page.)

FOREIGN PATENT DOCUMENTS

| | | |
|---|---|---|
| 0234902 | 9/1987 | European Pat. Off. . |
| 0242027 | 10/1987 | European Pat. Off. . |
| 0273522 | 7/1988 | European Pat. Off. . |
| 0310167 | 4/1989 | European Pat. Off. . |
| 0317628 | 5/1989 | European Pat. Off. . |
| 93301430 | 8/1993 | European Pat. Off. . |
| 305159 | 12/1988 | Japan . |
| 2165548 | 4/1986 | United Kingdom . |

OTHER PUBLICATIONS

Database WPI Sep. 1992, Derwent Publications Ltd., London, GB; AN 92-354793 & JP-A-4 258 637 (Dainippon Ink & Chem KK) 14 Sep. 1992, "abstract."

Database WPI, Week 9223, Derwent Publications Ltd., London, GB; AN 92-188159 & JP-A-4 121 756 (Fjuitsu Ltd) 22 Apr. 1992, "abstract."

Journal of Applied Polymer Science, vol. 31, No. 1, Jan., 1986, New York, USA, pp. 55–63, Subhas C. Shit, Beni Madhab Mahoto, Mrinal M. Miati, Sukumar Maitt *New Block Copolymers II. Synthesis and Characterization of an ABA-Type Block Copolymer,* "abstract."

*Primary Examiner*—Patricia A. Short
*Attorney, Agent, or Firm*—Robert F. Rywalski; Daniel J. Hudak; Frank C. Rote, Jr.

[57] ABSTRACT

A block copolymer of generally an AB, ABA, or A(-BA)$_n$ structure, or mixtures thereof where the A block is an unsaturated polyester, the B block is a flexible polymer having a Tg of 0° C. or lower, and n is 2 to 5. The various block components are generally first separately prepared as polymers with the flexible polymer generally having 1 or 2 functional end groups such as an amine group, a carboxyl group, or a hydroxyl group with the later being preferred. Alternatively, for low molecular weight unsaturated polyester blocks, the block can be made in situ. The preferred reaction route is to react a mono or dihydroxy terminated flexible polymer with a diisocyanate which subsequently can be readily reacted with the polyester. The block copolymers can be utilized as toughening agents. They furthermore can be utilized to coat a fiber structure such as individual fibers, a woven structure, or a nonwoven structure such as mats, rovings, bundles, and the like, with the coated fiber structures subsequently incorporated into a polymeric matrix such as polyester.

20 Claims, No Drawings

U.S. PATENT DOCUMENTS

| | | |
|---|---|---|
| 3,827,230 | 8/1974 | Marzocchi et al. . |
| 3,888,645 | 6/1975 | Marzocchi . |
| 4,020,036 | 4/1977 | South, Jr. . |
| 4,031,165 | 6/1977 | Saiki .................................. 525/444 |
| 4,051,199 | 9/1977 | Udipi et al. . |
| 4,076,767 | 2/1978 | Samejima . |
| 4,131,725 | 12/1978 | Udipi . |
| 4,242,415 | 12/1980 | Feltzin et al. . |
| 4,255,299 | 3/1981 | Daimon . |
| 4,290,939 | 9/1981 | Bertsch . |
| 4,309,473 | 1/1982 | Minamisawa et al. . |
| 4,329,438 | 5/1982 | Yamori et al. . |
| 4,341,672 | 7/1982 | Hsich et al. . |
| 4,413,072 | 11/1983 | Hess . |
| 4,419,487 | 12/1983 | Rowe . |
| 4,478,963 | 10/1984 | McGarry . |
| 4,515,710 | 5/1985 | Cobbledick . |
| 4,524,178 | 1/1985 | Hefner et al. . |
| 4,530,962 | 7/1985 | Alexander . |
| 4,562,115 | 12/1985 | Hergenrother . |
| 4,748,064 | 5/1988 | Harpell et al. . |
| 4,833,210 | 5/1989 | Fujii et al. . |
| 4,851,474 | 7/1989 | Willis ................................ 525/92 |
| 4,851,476 | 7/1989 | Willis . |
| 4,913,955 | 4/1990 | Noda et al. . |
| 4,970,265 | 11/1990 | Willis . |
| 4,981,916 | 1/1991 | Willis . |
| 5,084,508 | 1/1992 | Kagaya et al. . |
| 5,122,553 | 6/1992 | Takayama et al. ................ 523/514 |

POLYESTER-FLEXIBLE POLYMER BLOCK COPOLYMERS AND MIXTURES THEREOF

FIELD OF THE INVENTION

The present invention relates to a polyester-flexible polymer block copolymer having an unsaturated high amount by weight of the flexible polymer segment therein.

BACKGROUND

Heretofore, copolymers of polyester and elastomer have generally been made by polymerizing ester-forming monomers including mixtures of elastomeric prepolymers with ester-forming monomers, the result being the formation of a random polyester-elastomer copolymer containing elastomer segments therein. The structures of such copolymers are generally difficult to control and can be the result of side reactions, such as branching.

SUMMARY OF THE INVENTION

The present invention relates to block copolymers generally of the ABA or AB structure or mixtures thereof where the B block is a flexible polymer or segment having a Tg of generally 0° C. or less and preferably below minus 20° C. The flexible block generally has one or two hydroxyl end groups, amine end groups, or carboxylic end groups and thus is monofunctional or difunctional. The A block is generally a specific class of unsaturated polyesters preferably having only a mono-, or less desirably a di-, hydroxyl, carboxylic, or amine end group. The polyester A block is generally linked to the flexible polymer B block through an ester, an amide, a urea, or a urethane group. A preferred linkage is a urethane linkage formed by reacting a hydroxyl terminated B flexible polymer with a diisocyanate and subsequently reacting the same with a monohydroxyl terminated A polyester. Alternatively, the hydroxy-terminated B polymer can be reacted with a cyclic anhydride and an oxirane using specific catalysts to give an ABA block copolymer. The copolymers of the present invention are true block copolymers in that they generally contain linear AB or ABA type structure and generally have little, if any, chain extension or branching structure, and may contain minor amounts of A(BA)$_n$ type block copolymers where n is 2 to 5, preferably 2.

DETAILED DESCRIPTION

The B portion of the block copolymers of the present invention can generally be any flexible polymer. Such flexible polymers are generally defined as any polymer which has a Tg of about 0° C. or less and preferably below minus 20° C., often are liquid, and are readily known in the art and to the literature, including the preparation thereof.

One such class of flexible polymers is made from one or more various conjugated diene monomers having from 4 to 12 carbon atoms, desirably from 4 to 8 carbon atoms with 4 or 5 carbon atoms being preferred. Examples of specific dienes include butadiene, isoprene, 2,3-dimethyl-1,3-butadiene, pentadiene, hexadiene, 4,5-diethyl-1,3-octadiene, and the like, with butadiene and isoprene being preferred. The structure of such conjugated dienes is generally such that it has a Tg within the above-noted ranges. Such polymers are terminated with either one or two functional end groups wherein the functional end group is hydroxyl, amine, or carboxyl.

Thus, the B block can be a mono- or di- hydroxyl terminated flexible polymer, a mono or diamine terminated flexible polymer, or a mono- or di- carboxyl terminated flexible polymer. Such polymers are well-known to the art and are commercially available as from the BFGoodrich Chemical Co., under the Hycar ® trademark.

Another class of the B block flexible polymer is the various hydrogenated dienes or polyolefins which are mono or di-hydroxyl, carboxyl, or amine terminated. Such polymers, as well as the preparation thereof, are well known to the art and to the literature. Typical diene polymers are made from one or more conjugated dienes, having from 4 to 10 carbon atoms, such as 1,3-butadiene, isoprene, dimethyl butadiene, and the like. The polymerization of the diene monomer, typically, may be done via anionic initiation (e.g. with di-lithium hydrocarbyl initiators) or via free-radical polymerization, e.g. by initiation with hydrogen peroxide, which also introduces hydroxy end groups. In case of anionic polymerization, OH-end groups are advantageously introduced by reaction of the polymeric carbanion chain ends with ethylene oxide. These techniques are generally well known to the literature. The hydroxy-functional polydienes may be hydrogenated, for example, partially or substantially (i.e., at least 50, 70, or 90 percent of the unsaturated sites), and even completely hydrogenated, according to any conventional method known to the art and to the literature. Complete hydrogenation of various diene polymers such as 1,4-polyisoprene is equivalent to an alternating ethylene/propylene hydrocarbon polymer. The hydrocarbon polymers generally have a number average molecular weight from about 500 to 15,000 and preferably from about 1,000 to about 8,000. The polymers are desirably liquid at room temperature, but can have a melting point up to about 80° C. Preferred polymers are hydroxyl functional telechelic, hydrogenated diene polymers containing 2 to 6 and preferably 2 to 4 hydroxy end groups per polymeric molecule (polymer unit).

An especially preferred hydrogenated butadiene polymer is commercially available as Polytail H and Polytail HA sold by Mitsubishi Kasei Corp., and has the very generalized structure:

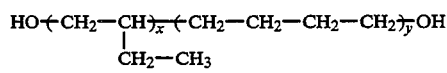

wherein X and Y are randomly distributed and the structure can contain additional —OH groups.

The hydroxyl, carboxylic or amine terminated polyolefins are generally made from one or more olefins having from 2 to 6 carbon atoms such as ethylene, propylene, butylene, and the like. Such functional polyolefins can also be made by utilizing minor amounts (i.e., up to about 50 mole percent and preferably up to 20 mole percent) of ethylenically unsaturated comonomers such as styrene, vinyl toluene, alpha-methylstyrene, divinylbenzene, and similar aromatic monomers; or vinyl monomers, such as acrylonitrile, methacrylonitrile, vinylidene chloride, and similar aliphatic vinyl monomers; or hydroxyl functional ethylenically unsaturated monomers such as 2-hydroxyl ethyl acrylate and methacrylate, 2-hydroxy propyl acrylate and methacrylate and similar hydroxy alkyl acrylates. Regardless of the type of polyolefin, it should contain either one or two hydroxyl groups per average molecule.

Still another class of the B block flexible polymer is the various mono- or di- hydroxyl, amine, or carboxyl terminated nitrile containing copolymers. These copolymers are prepared in accordance with conventional techniques well known to the art and to the literature and are generally made from one or more monomers of acrylonitrile or an alkyl derivative thereof with one or more conjugated dienes and optionally one or more monomers of acrylic acid, or an ester thereof. Examples of acrylonitrile monomers or alkyl derivatives thereof include acrylonitrile and alkyl derivatives thereof having from 1 to 4 carbon atoms such as methacrylonitrile, and the like. The amount of the acrylonitrile or alkyl derivative monomer is from about 1 percent to about 50 percent by weight and preferably from about 5 percent to about 35 percent by weight based upon the total weight of the nitrile containing copolymer.

The conjugated diene monomers generally have from 4 to 10 carbon atoms with from 4 to 6 carbon atoms being preferred. Examples of specific conjugated diene monomers include butadiene, isoprene, hexadiene, and the like. The amount of such conjugated dienes is generally from about 50 percent to about 99 percent by weight and preferably from about 55 percent to about 75 percent by weight based upon the total weight of the nitrile rubber forming monomers. Such mono or difunctional nitrile rubbers can be readily prepared generally containing either hydroxyl or carboxyl end groups and are known to the art and to the literature and are commercially available such as from The BFGoodrich Company under the tradename Hycar.

Yet another class of the B block flexible polymers is the various copolymers made from vinyl substituted aromatics having from 8 to 12 carbon atoms and conjugated diene monomers generally having from 4 to 12 carbon atoms, desirably from 4 to 8 carbon atoms, and preferably 4 or 5 carbon atoms. Examples of suitable aromatic monomers include styrene, alphamethyl styrene, and the like, with specific examples of conjugated dienes including hexadiene, isoprene, butadiene, and the like. A preferred copolymer is a random styrene butadiene copolymer. The amount of the vinyl substituted aromatic component, such as styrene, is generally from about one part to about 50 parts, and desirably from about 1 part to about 30 parts by weight, based upon the total weight of the copolymer. The preparation of such polymers having mono or di- hydroxyl, amine, or carboxyl terminated vinyl substituted aromatic conjugated diene copolymer are well known to the art and to the literature.

A still further class of the B block flexible polymers is the various polyethers which are either mono- or di- hydroxyl, amine, or carboxyl terminated. Such polyether polyols are generally made by reacting one or more alkylene oxides having from 2 to 10 or 20 carbon atoms such as propylene oxide with a strong base such as potassium hydroxide, preferably in the presence of water, glycols and so forth. Polyether polyols can also be made by ring opening polymerization of tetrahydrofuran or epichlorohydrin using acid catalysts. Examples of polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia, or polyfunctional amines. The above mono- or di-hydroxyl, amine, or carboxyl terminated polyethers, as well as the preparation thereof, are well known to the art and are commercially available. Hydroxy terminated polytetrahydrofurans are commercially available as from DuPont as Terethane. Hydroxy terminated polypropylene oxides are commercially available as from Dow Chemical as Voranol and amine terminated polyethers are commercially available as from Texaco as Jeffamine.

Still another class of the B block flexible polymers is the various saturated polyesters made from aliphatic dicarboxylic acids or aliphatic anhydrides and glycols, and such are well known to the art and to the literature, as is the preparation thereof, and are commercially available. The aliphatic dicarboxylic acids and anhydrides have from 1 to 10 carbon atoms, with specific examples including carbonic acid, malonic acid, succinic, glutaric acid, adipic acid, pimelic acid, suberic acid, azelaic acid, sebacic acid, the anhydride counterparts thereof, and the like, with adipic acid generally being preferred. Optionally included within the above aliphatic dicarboxylic acids are minor amounts, that is up to 20 percent by weight based upon a total weight of the acids, of an aromatic diacid such as phthalic acid, isophthalic acid, terephthalic acid, and the like. Mixtures of all of the above acids can be utilized as well. The glycols generally have from 2 to 15 carbon atoms with specific examples including ethylene glycol, propylene glycol, 1,3-butylene glycol, 1,4-butylene glycol, pentane diol, hexane diol, cyclohexanedimethanol dipropylene glycol, diethylene glycol, pinacol, and the like. Preferred glycols include diethylene glycol or a mixture of propylene glycol with ethylene glycol.

The polyester or A block is generally an unsaturated polyester having an average molecular weight of between 100 or 500 to 2,000 or 5,000 and has one, or less desirably two, functional end groups thereon such as hydroxyl, carboxyl, or amine. The polyesters are made by the copolymerization of generally cyclic ethers typically containing 2 or 3 carbon atoms in the ring and an unsaturated anhydride, as well as optional saturated anhydrides using double metal complex cyanide catalysts. Generally any cyclic oxide can be utilized such as 1,2-epoxides, oxetanes, and the like, with the cyclic ether having a total of up to 18 carbon atoms, as for example 2 carbon atoms in the ring and up to 16 carbon atoms in the side chains. Such cyclic oxide monomers can also contain one or more aliphatic double bonds and preferably only contain one aliphatic carbon to carbon double bond. Examples of suitable cyclic oxides include ethylene oxide (1,2-epoxy ethane), 1,2-propylene oxide, 1,2-butene oxide, 1,2-hexene oxide, 1,2-dodecane monoxide, isobutylene oxide, styrene oxide, 1,2-pentene oxide, isopentene oxide, 1,2-heptene oxide, allyl gylcidyl ether, isoheptene oxide, 1,2-octene oxide, methyl glycidyl ether, ethyl glycidyl ether, phenyl glycidyl ether, butadiene monoxide, isoprene monoxide, styrene oxide, tolyl glycidyl ether, 1,2-pentadecene oxide, epichlorohydrin, glycidoxypropyltrimethoxysilane, and the like. Generally, ethylene oxide, propylene oxide, and butylene oxide are preferred.

Generally anhydrides having a total of from 4 to 20 carbon atoms are utilized and five-member cyclic anhydrides are preferred, especially those having a molecular weight between 98 and 400. Mixed anhydrides as well as mixtures of anhydrides may be used. Examples of preferred anhydrides include those of maleic, phthalic, itaconic, nadic, methyl nadic, hexahydrophthalic, succinic, tetrahydrophthalic, 1,2-naphthalenedicarboxylic, 1,2-tetrahydronaphthalene dicarboxylic acids, and the like. Further examples include such anhydrides in which hydrogen atoms have been substituted by halogen, hydroxyl or $C_{1-8}$ carbon atom alkyl, aryl or aralkyl groups such as the anhydrides of 3,4-dichlorophthalic, hexachlorodicycloheptadiene dicarboxylic (chlorendic), 8-hydroxyl-1,2-naphthalenedicarboxylic, 2,3-dimethyl maleic, 2-octyl-3-ethyl maleic, 4,5-dimethyl phthalic, 2-phenylethyl maleic, 2-tolyl maleic and the like.

As noted above, mixtures of saturated and unsaturated anhydrides can be utilized with generally maleic anhydride being preferred. Such polyesters are known to the art and to the literature and are generally made utilizing double metal cyanide complex catalysts. The method, preparation and scope of the various types of unsaturated polyesters which are suitable in the present invention are described in U.S. Pat. No. 3,538,043 which is hereby fully incorporated by reference with regard to all aspects thereof. For example, suitable catalysts for preparation of the polyester A block include zinchexacyanocobaltate and analogs thereof as well as various metalloporphyrins. Reaction temperatures generally include ambient to about 130° C. with from about 40° to about 80° C. being preferred. Such polyesters if made by utilizing maleic acid, can be isomerized with various conventional amines such as morpholine or piperidine to produce the fumarate isomer, as taught in U.S. Pat. No. 3,576,909, to Schmidle and Schmucker, which is hereby fully incorporated by reference with regard to all aspects thereof. Hydroxyl or carboxyl end groups are readily obtained by simply utilizing either an excess of the glycol or of the acid. Amine groups are added generally by post-reaction with an amine compound such as ethylene diamine, and the like. Such aspects are of course well known to the art and to the literature. Generally, such polyester A blocks have a significant molecular weight, as above 500. A preferred ester of the present invention is poly(propylenefumarate).

The monofunctional terminated unsaturated polyester A block is reacted with the B block flexible polymer to yield a block copolymer. If the flexible B block is monoterminated, an AB type block copolymer will be formed. If the flexible polymer B block is a diterminated functional polymer, an ABA type block copolymer will be formed. However, if a difunctional terminated polyester A block is utilized with a difunctional terminated flexible B block, an ABA type block copolymer is produced along with generally small amounts of an A(-BA)$_n$ type block copolymer where n is 2 to 5. Typically, such mixtures contain a majority amount, that is at least 50 percent and often at least 70, 80, or even 90 percent by weight of the ABA block copolymer.

When the flexible polymer B block is hydroxyl terminated, desirably the unsaturated polyester A block contains a monofunctional, or less desirably a difunctional, terminal acid end group so that an ester reaction occurs and an ester linkage is formed. Similarly, if the flexible polymer B block contains a carboxyl terminal group, the unsaturated polyester A block end group is desirably a hydroxyl so that an ester linkage can be formed. In either situation, a conventional esterification reaction is carried out in a manner well known to the art. The net result is the formation of an AB or an ABA block polymer and possible small amounts of A(BA)$_n$ block copolymer having an ester linkage between the blocks.

If the flexible B block is amine terminated, desirably the polyester A block has a monocarboxylic acid functional end group. Such a reaction is carried out in a conventional manner and results in an amide linkage. Alternatively, if the polyester A block is amine-terminated, a diisocyanate can be reacted with a mono- or di- hydroxyl terminated B block, so that the reaction product thereof with the amine-terminated A block results in a urea linkage.

Regardless of the type of linkage formed between the "A" block and the "B" block, the reaction conditions for forming such linkages are well known to the art and to the literature, and result in the formation of a novel block copolymer. Such reactions including the conditions thereof, etc., as well as the linkage reactions set forth hereinbelow are morely fully defined in *Advanced Organic Chemistry, Reactions, Mechanisms, and Structures,* J. March, 2nd Edition, McGraw Hill, New York, N.Y., 1977, which is hereby fully incorporated by reference including subsequent editions thereof.

It is to be understood that the A and B type blocks are typically preformed polymers which are reacted together and that no in situ polymerization of the A block or the B block occurs. In other words, the present invention is generally free of in situ polymerization or polymerization of one of the blocks on an existing block when the molecular weight of the A block is from about 500 or 600 to about 5,000.

It is also within the scope of the present invention to utilize a polyester A segment of very low molecular weight, such as for example from about 100 to about 500 or 600, wherein the ester segment or A block is merely the in situ reaction of a single or a few dicarboxylic anhydride and cyclic oxide molecules, such as maleic anhydride and propylene oxide. Preferably, the flexible B block is hydroxyl terminated. Such low molecular weight polyester A blocks result in a block copolymer having a high ratio or amount of the flexible polymer A block.

To prepare such low molecular weight A segments or blocks, it is advantageous to react the hydroxy terminated flexible B segment directly with the cyclic anhydride and propylene oxide. Suitable catalysts for the reaction include the double metal cyanide complex catalysts described above as well as the various titanates and alkyl substituted tin compounds like dibutyltin oxide. Preferred anhydrides for making such low molecular weight A segments have unsaturation such as maleic, tetrahydrophthalic, itaconic, nadic, methyl nadic and the like, although mixtures of unsaturated and saturated cyclic anhydrides may also be used. Generally, any cyclic oxide can be used with ethylene and propylene oxides being preferred.

According to the preferred embodiment of the present invention, the flexible polymer B block is hydroxyl terminated and is reacted with a monohydroxyl terminated unsaturated polyester A block through the utilization of a polyisocyanate to yield a block copolymer having a minimum weight of 500 or 600. That is, a polyisocyanate is reacted with the hydroxyl end group of the flexible polymer B block thereby leaving a free isocyanate group which is subsequently reacted with the hydroxyl end group of the unsaturated polyester A block. Examples of polyisocyanates which can be utilized generally have the formula R(NCO)hd n where n is generally about 2 (i.e. a diisocyanate) although it can be slightly higher or lower as when mixtures are utilized. R is an aliphatic having from about 2 to about 20 carbon atoms with from about 6 to about 15 carbon atoms being preferred or an aromatic including an alkyl substituted aromatic having from about 6 to about 20 carbon atoms, with from about 6 to about 15 carbon atoms being preferred, or combinations thereof. Examples of suitable diisocyanates include 1,6-diisocyanato hexane, 2,2,4-and/or 2,4,4-trimethyl hexamethylene diisocyanate, p-and m-tetramethyl xylene diisocyanate, dicyclohexylmethane-4,4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, (IPDI) isopropylene-bis-(p-phenyl isocyanate) and sulfone-bis-(p-phenyl isocyanate). Also useful are diisocyanates prepared by capping low molecular weight, that is less than 300, diols, ester diols or diamines with diisocyanates, such as the reaction products of one mole of 1,4-butanediol or bis-(4-hydroxylbutyl)-succinate (molecular weight=262) with two moles of hexamethylene diisocyanate. TDI and IPDI are preferred for reasons set forth herein below. The reaction between the diisocyanate and the hydroxyl terminated flexible polymeric B block is carried out in an inert atmosphere such as nitrogen, at ambient temperatures and up to 30° C., desirably in the presence of urethane catalysts. Such catalysts are known to the art as well as to the literature and generally include tin compounds such as various stannous carboxylates, for example stannous acetate, stannous octoate, stannous laurate, stannous oleate and the like; or dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate and the like. Similarly, there can be used a trialkyltin hydroxide, dialkyltin oxide or dialkyltin chloride. As an alternative or in addition to the above tin compounds, various tertiary amines can be used such as triethylamine, benzyldimethylamine, triethylenediamine and tetramethylbutanediamine. The tin catalysts, when utilized, are generally used in amounts of 0.5 parts or less, i.e., in the range of about 0.01 to 0.5 parts, by weight per 100 parts of prepolymer. The tertiary amine catalysts, when utilized, can be used in amounts of 0.01 to about 5 parts by weight per 100 parts of prepolymer.

It is an important aspect of the present invention that the reaction of the diisocyanate with mono- or di- hydroxyl terminated flexible polymer B block occurs separately, that is, not in the presence of, in the absence of, or free from the mono- or di-hydroxyl functional unsaturated polyester A block. This ensures that a random copolymer containing block segments therein is not produced. Moreover, it is another important aspect of the present invention to utilize diisocyanate compounds which have differential reaction rates with regard to the two isocyanate end groups. This is to ensure that only one of the groups reacts with the hydroxyl terminated flexible B block and the remaining unit generally remains unreacted until subsequent reaction of the monohydroxyl terminated polyester A block. For this reason, TDI and IPDI are preferred. The amount of the diisocyanate utilized is generally an equivalent amount to the hydroxyl groups in the flexible B block and thus is an equivalent ratio of from about 0.8 to about 1.2, and desirably from about 0.9 to about 1.1. Similarly, the amount of the polyester block A is generally an equivalent amount to the urethane linkages of the flexible B block, be it one linkage or two linkages per B block.

The mono- or di- hydroxyl terminated unsaturated polyester A block is then subsequently added to the vessel or solution containing the urethane terminated flexible polymer B block and reacted therewith in a conventional manner well known to the art and to the literature. The result is a urethane linkage between the polyester A block and the flexible polymer B block.

A distinct advantage of utilizing the urethane reaction route is that a low temperature reaction can be carried out which minimizes side reactions and that no unreacted compounds remain which have to be removed from the reaction product.

Another method of making a mixture of block copolymers containing a large amount of AB block copolymer is to react a diisocyanate-terminated flexible polymer B block having two free NCO groups thereon with an approximately equivalent amount of a low molecular weight alcohol and then subsequently reacting the product with an approximately equivalent amount of the functional terminated unsaturated polyester A block. The low molecular weight alcohol can be methanol, ethanol, n-propanol, isopropanol, t-butanol, and the like. In lieu of the low molecular weight saturated alcohol, a functional compound containing an ethylenically unsaturated polymerizable group can be utilized, such as hydroxy-styrene, hydroxy-ethyl-acrylate, methacrylate, or allyl alcohol.

Another preferred embodiment relates to the preparation of the low molecular weight A blocks which involves the reaction of hydroxyl terminated B blocks with a cyclic unsaturated anhydride and an alkalene oxide as noted above. Mixtures of saturated and unsaturated anhydrides can also be used.

Another aspect of the present invention is that the above-noted AB, or ABA, or $A(BA)_n$ block copolymers can be cured. Curing can occur utilizing conventional compounds such as ethylenically unsaturated compounds, for example vinyl or allyl compounds, and conventional free radical catalyst. Examples of ethylenically unsaturated compounds include styrene, a preferred compound, vinyl toluene, divinyl benzene, diallyl phthalate, and the like; acrylic acid esters and methacrylic acid esters wherein the ester portion is an alkyl having from i to 10 carbon atoms such as methylacrylate, ethylacrylate, n-butylacrylate, 2-ethylhexylacrylate, methyl methacrylate, ethylene glycol dimethacrylate, and the like. Other unsaturated monomers include vinyl acetate, diallyl maleate, diallyl fumarate, vinyl propionate, triallylcyanurate, and the like, as well as mixtures thereof. The amount of such compounds based upon 100 parts by weight of the block copolymers can generally vary from about 1 to about 500 parts by weight, and desirably from about 1 to about 100 parts by weight. The free radical initiators can include organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

The invention will be understood by reference to the following examples setting forth the preparation of unsaturated polyester-blocked flexible polymer compositions.

EXAMPLE 1

Poly(propylene fumarate)-b-poly(butadiene)-b-poly(propylene fumarate) triblock In a 1-L resin kettle equipped with thermometer, heating mantle and stirring were charged 203 g (70 mmoles —OH) of BFG Hycar 2,000×169 (a dihydroxy-terminated polybutadiene), 263g of styrene, 15.7 g (141mmoles total —NCO) of isophorone diisocyanate, 2.3 g of zinc stearate, and 1.4 g of DABCO T9 catalyst. The materials were mixed thoroughly under nitrogen and warmed to 70° C. After two hours 80 g (70 mmoles —OH) of a 80 percent solids in styrene solution of a mono-hydroxy unsaturated polyester (polypropylene fumarate, 850 MW) was added to the reaction mixture, along with 2.5 g of 10 percent benzoquinone in diallyl phthalate, and 0.5 g of DABCO T9 catalyst. The reaction mixture was cooled after three hours to room temperature, and the solution poured into a suitable container. The triblock had a flexible polymer to unsaturated polyester weight ratio of 3.2 to 1.0, and contained 50 percent solids in styrene.

EXAMPLE 2

Poly(propylene fumarate)-b-poly(butadiene-CO-acrylonitrite)-polypropylene fumarate) triblock The above triblock was prepared by charging a 2-L resin kettle as above with 600 g (370 mmoles —OH) of Hycar 1300×34 (a dihydroxy-terminated poly(butadiene-CO-acrylonitrile, 26 percent AN content) and 480 g of styrene which was stirred overnight under nitrogen to dissolve. To the stirred solution was then added 52 g (600 mmoles total —NCO) of toluene diisocyanate, and 2.0 g DABCO T12 catalyst. The mixture was stirred for one-half hour during which time the temperature rose to 37° C., followed by the addition of 675 g (350 mmoles —OH) of an 80 percent solids in styrene solution of a mono-hydroxy unsaturated polyester (polypropylene fumarate, approx. 1600 MW). The mixture was kept at 37° C. with stirring for six hours, and then poured into a container. The triblock had a flexible polymer to unsaturated polyester weight ratio of 1.1 to 1.0, and contained 65 percent solids in styrene.

EXAMPLE 3

Poly(propylene fumarate)-b-poly(butadiene) block co-polymer

The above block copolymer was prepared by charging 200 g (70 mmoles -OH) of Hycar 2,000×169 to a 1-L resin kettle along with 234 g of styrene, 12.5 g (113 mmoles total —NCO) isophorone diisocyanate, 2.0 g of zinc stearate, and 2.0 g DABCO T9 catalyst. The starting materials were mixed thoroughly under nitrogen, and then heated to 70° C. After 90 minutes, 1.7 g (28 mmoles —OH) of n-propanol was added, and after 2.5 hours 36 g (32 mmoles) of an 80 percent solids in styrene solution of a monohydroxy unsaturated polyester (polypropylene fumarate, approx. 1400 MW). The mixture was stirred for another three hours, then cooled and transferred to a suitable container. The block copolymer had a flexible polymer to unsaturated polyester weight ratio of 7.0 to 1.0, and contained 53 percent solids in styrene. This composition was a mixture containing large amounts of an AB block copolymer.

EXAMPLE 4

Poly(propylene fumarate)-b-poly(butadiene-CO-acrylonitrile) block copolymer

The above block copolymer was prepared in a 1-L resin kettle as above with a charge of 361 g (225 mmoles —OH) Hycar 1300×34 and 175 g (210 mmoles total —OH) of 80 percent solids in styrene solution of dihydroxy unsaturated polyester (polypropylene fumarate, approximately 1400 MW), which were mixed thoroughly at 110° C. under vacuum for 90 minutes. The blend was cooled to 80° C. under nitrogen, and 21.6 g (250 mmoles total NCO) of TDI added followed by stirring for ten minutes. DABCO T-12 catalyst (0.8 g) was added, causing an immediate increase in viscosity. Stirring was continued for one hour and the mixture cooled to 50° C. followed by the addition of 531 g of styrene. The solution was transferred to a suitable container. The flexible polymer to unsaturated polyester weight ratio of this additive was 2.6 to 1.0, and the solution contained 48 percent solids in styrene. This composition was a mixture containing $A(BA)_n$ block copolymers.

EXAMPLE 5

Polypropylene fumarate)-b-poly(butadiene-co-acrylonitrile) block copolymer

The above block copolymer was prepared by charging a 500-ml resin kettle with 189 g of a solution of Hycar 1300×31 (dicarboxy terminated polybutadiene-co-acrylonitrile, 10 percent AN content; 48.5 weight percent, 91.5 g, 51 mmoles carboxyl) and dihydroxy terminated polypropylene fumarate (1300 MW; 51.5 percent, 97.5 g, 150 mmoles —OH). The kettle was heated under vacuum at 150° to 160° C. for two hours to remove water. The product was transferred to a suitable container. The block copolymer had a flexible polymer to unsaturated polyester weight ratio of 0.9 to 1.0. This composition contained ABA block copolymers.

EXAMPLE 6

Poly(propylene fumarate)-b-poly(butadiene-co-acrylonitrile) block copolymer

The above block copolymer was prepared by charging a 1.5-L resin kettle with 508 g (726 mmoles —OH) of unsaturated polyester (dihydroxy terminated polypropylene fumarate, approximately 1400 MW) 404 g (234 mmoles carboxyl of Hycar 1300×13 (dicarboxy terminated Polybutadiene-co-acrylonitrile, 26 percent AN content), 0.4 g benzoquinone, and 0.4 g of triphenylphosphonium bromide. The mixture was stirred and heated to 150° C. under vacuum for four hours. After cooling to room temperature, 508 g of styrene was added and mixed to dissolve the polymer. The product was transferred to a suitable container. The block copolymer had a flexible polymer to unsaturated polyester ratio of 0.8 to 1.0, and contained 57 percent solids in styrene. This composition contained ABA block copolymers.

EXAMPLE 7

Poly(propylene fumarate)-b-poly(tetrahydrofuran)-b-poly(propylene fumarate) triblock The above triblock was prepared by combining 400 grams of isocyanate-terminated poly(tetrahydrofuran 347 mmoles NCO), available from Air Products under the trademark PET90A, 312 grams of toluene, 3 grams of DABCO T9 ® catalyst, available from Air Products and Chemical Inc., and 224 grams of a solution of monohydroxy-terminated poly(propylene fumarate) (80 percent solids in stytens, 347 mmoles total —OH) in a one liter resin kettle equipped with nitrogen purge, a heating mantle, and a stirrer. The reagents were thoroughly mixed at room temperature under nitrogen, after which the contents were heated and maintained at 40° C. until the reaction was complete. The progress of the reaction was monitored using FTIR. Completion of the reaction was marked by the disappearance of the —NCO absorbance from the IR spectrum, at which time the product was cooled to room temperature. This triblock copolymer had a flexible polymer to unsaturated polyester ratio of approximately 2 to 1.

EXAMPLE 8

A poly(propylene fumarate)-b-poly(butadiene)-b-poly(propylene fumarate) triblock The above triblock was prepared by combining, in a one liter resin kettle equipped with nitrogen purge, heating mantle, and stirrer, 500 grams of hydroxy-terminated polybutadiene (137 mmoles total OH), available from the BFGoodrich Chemical Company under the trademark HYCAR 2,000×169 ®, 310 grams of toluene, grams of isophorone diisocyanate having 279 mmoles total —NCO, and 3 grams of DABCO T9 ®catalyst. The contents were thoroughly mixed under nitrogen, and then warmed to 60° C. for 2.5 hours. To the kettle were added 93 grams of a solution of monohydroxy-terminated poly(propylene fumarate) (80 percent solids in styrene, 144 mmoles total —OH), and 150 grams of toluene to reduce the viscosity. The contents were reacted for about 3 hours at 60° C. until the IR spectrum indicated complete consumption of —NCO. The product was then cooled to room temperature. This triblock copolymer had a flexible polymer to unsaturated polyester ratio of 6.2 to 1.0.

EXAMPLE 9

Hydroxypropylmaleate-b-poly(diethyleneadipate)-b-hydroxypropylmaleate triblock

A 1-quart polymerization bottle was charged with 156.5 g (313 mmoles —OH) of Formrez 11-112 (a dihydroxy poly(diethylene adipate), available from Witco Chemical Co.), 30.7 g of maleic anhydride (313 mmoles), 124 g of toluene as solvent, and 0.3 g of tetrabutyl titanate catalyst. The bottle was sealed and heated in a waterbath to 80° C. On completion of the reaction of the maleic anhydride as determined by FTIR, 19.1 g of propylene oxide (329 mmoles) was charged to the bottle, and the reaction completed at 65° C. Determination of acid number and NMR indicated 100 percent maleic anhydride capping, and approximately 80 percent hydroxypropyl ester formation. This triblock copolymer had a flexible polymer to unsaturated polyester ratio of approximately 3.1 to 1.

EXAMPLES 10

Hydroxpropylmaleate-b-Poly(propylene adipate)-b-hydroxypropylmaleate triblock

A 1-quart polymerization bottle was charged with 407.3 g (1.63 mmoles —OH) of Formrez 33–225 (a dihydroxy poly(propylene adipate), available from Witco Chemical Co.), 160.1 g maleic anhydride (1.63 mmoles), 153 g toluene as solvent, and 1.7 g of tetrabutyl titanate catalyst. The bottle was sealed and heated in a waterbath to 80° C. On completion of the reaction of the maleic anhydride as determined by FTIR, 94.7 g of propylene oxide (1.63 mmoles) was charged to the bottle, and the reaction completed at 65° C. Determination of acid number and NMR indicated 100 percent maleic anhydride capping, and approximately 80 percent hydroxypropyl ester formation. This triblock copolymer had a flexible polymer to unsaturated polyester ratio of approximately 1.6 to 1.

The above-identified diblock and triblock, etc., polyester-flexible polymer copolymers can be utilized as toughening agents in a variety of plastics such as unsaturated polyesters or vinyl ester resins. Moreover, they can be directly applied to a fiber structure and cured to coat the same and alleviate stress cracking on the surface of the fibers. Subsequently, the fiber structure coated with the cured polyester-flexible polymer block copolymers of the present invention can be utilized in various matrix formations such as in sheet molding compounds, in the preparation of sheet resins containing fiber reinforcement therein, in the preparation of fiber structures utilized in mats, nonwovens, wovens, and the like, in wet lay-up sheets, in resins utilized in injection molding, bulk molding, and the like.

While in accordance with the Patent Statutes, the best mode and preferred embodiment has been set forth, the scope of the invention is not limited thereto, but rather by the scope of the attached claims.

What is claimed is:

1. A composition, comprising, a curable block copolymer having the formula AB, or ABA, or a mixture thereof, or a mixture of ABA and A(BA)$_n$ where n is 2 to 5, wherein the amount of said ABA in said mixture of said ABA and said A(BA)$_n$ is at least 50 percent by weight, wherein said A block is an unsaturated polyester having a molecular weight of from about 100 to 5,000, wherein said unsaturated polyester A block is polymerized from monomers consisting essentially of a saturated cyclic ether having 2 or 3 carbon atoms in the ether ring and a total and of 2 to 18 carbon atoms and from an unsaturated anhydride and optionally a saturated anhydride having a total of from 4 to 20 carbon atoms, said B block is a flexible polymer having a Tg of 0° C. or less, and wherein said B block polymer is a polyether, or a saturated polyester.

2. A composition according to claim 1, wherein said polyether is made from one or more alkylene oxides having from 2 to 20 carbon atoms, and wherein said saturated polyester is made from one or more dicarboxylic acids or anhydrides having from 1 to 10 carbon atoms and one or more glycols having from 2 to 15 carbon atoms.

3. A composition according to claim 2, wherein said A block and said B block are connected by an ester linkage, an amide linkage, a urea linkage, or a urethane linkage, wherein said B block is said saturated polyester, and wherein said saturated polyester has a Tg of minus 20° C. or less.

4. A composition according to claim 3, wherein the molecular weight of said unsaturated polyester A block is from about 100 to about 500, wherein said A block is connected to said B block by said ester linkage, wherein said block copolymer is said ABA block copolymer, wherein said saturated polyester is poly(ethylene adipate), poly(diethylene adipate) or poly(propylene adipate), and wherein said unsaturated polyester is hydroxypropylmaleate or hydroxypropylfumarate, or combinations thereof.

5. The cured composition of claim 4.

6. A composition according to claim 3, wherein the molecular weight of said unsaturated polyester A block is from about 500 to 2,000, wherein said A block is connected to said B block by an ester linkage, wherein said block copolymer is said ABA block copolymer, and wherein said saturated polyester is poly(ethylene adipate), poly(diethylene adipate), or poly(propylene adipate), and wherein said unsaturated polyester is poly(propylene maleate) or poly(propylene fumarate), or combinations thereof.

7. A composition according to claim 4, wherein said composition is cured with styrene.

8. The cured composition of claim 1.

9. A block copolymer, comprising:
the curable reaction product of a mono or difunctional hydroxyl, carboxyl, amine, or isocyanate terminated unsaturated polyester block having a molecular weight of from about 500 to about 5,000, and a mono or difunctional hydroxyl, carboxyl, amine or isocyanate terminated flexible polymer block having a Tg of 0° C. or less, and where said flexible block is a polyether, or a saturated polyester.

10. A block copolymer according to claim 9, wherein said reaction product is said monofunctional flexible polymer block linked to said monofunctional unsaturated polyester block, or said difunctional flexible polymer block with each said functional group linked to said monofunctional unsaturated polyester block or to said difunctional unsaturated polyester block, or mixtures thereof, wherein said flexible block is said polyether made from one or more alkylene oxides having from 2 to 20 carbon atoms, or said saturated polyester made from one or more dicarboxylic acids or anhydrides having from 1 to 10 carbon atoms and a glycol having from 2 to 15 carbon atoms.

11. A block copolymer according to claim 10, wherein said flexible block is said saturated polyester, wherein said unsaturated polyester block is monofunctional, and wherein said flexible saturated polyester block is difunctional.

12. A block copolymer according to claim 11, wherein said unsaturated polyester is made from a cyclic ether having 2 to 3 carbon atoms in the ether ring and a total of 2 to 18 carbon atoms and from an unsaturated anhydride and optionally a saturated anhydride having a total of from 4 to 20 carbon atoms.

13. A block copolymer according to claim 12, wherein said saturated polyester is poly(ethylene adipate), poly(diethylene adipate) or poly(propylene adipate), and wherein said unsaturated polyester is poly(propylene maleate) or poly(propylene fumarate), or combinations thereof.

14. The block copolymer of claim 13 which is cured.

15. A process comprising; preparing a curable block copolymer by reacting a mono or difunctional hydroxyl, carboxyl, amine, or isocyanate terminated unsaturated polyester block with a mono or a difunctional hydroxy, amine, carboxyl, or isocyanate terminated flexible polymer block, and forming a curable block copolymer of AB, ABA, or mixtures thereof, or a mixture of ABA and $A(BA)_n$ where n is 2 to 5 wherein the amount of said ABA in said mixture of said ABA and said $A(BA)_n$ is at least 50 percent by weight, where A is said unsaturated polyester block and B is said flexible polymer block, said flexible polymer block having a Tg of 0° C. or less, said block copolymer having at least 50 percent by weight of said B block therein, and wherein said B polymer block is a polyether, or a saturated polyester, and
incorporating said curable block copolymer in a plastic compound as a toughening agent.

16. A process according to claim 15, wherein said B block is said polyether made from one or more alkylene oxides having from 2 to 20 carbon atoms, or said saturated polyester made from one or more dicarboxylic acids or anhydrides having from 1 to 10 carbon atoms and a glycol having from 2 to 15 carbon atoms, wherein said unsaturated polyester is made from a cyclic ether having 2 or 3 carbon atoms in the ether ring and a total of 2 to 18 carbon atoms and from an unsaturated anhydride and optionally a saturated anhydride having a total of from 4 to 20 carbon atoms, wherein said A block and said B block 17. A process according to claim 16, wherein said block copolymer is said ABA block copolymer, including curing said curable ABA block copolymer, wherein the molecular weight of said unsaturated polyester is from about 500 to about 2,000, wherein said saturated polyester is poly(ethylene adipate), poly(diethylene adipate) or poly(propylene adipate), and wherein said unsaturated polyester is poly(propylene maleate) or poly(propylene fumarate), or combinations thereof, and wherein said block copolymer is cured with styrene.

18. A process comprising; preparing a curable block copolymer by reacting an unsaturated dicarboxylic anhydride with a mono or dihydroxy terminated flexible saturated polyester polymer segment (B) thereby forming a carboxylic acid terminated flexible polymer segment (B′), reacting said carboxylic acid terminated flexible polymer segment (B′), with a saturated cyclic alkylene oxide and forming an AB or ABA block copolymer, wherein said flexible polymer segment has a Tg of 0° C. or less, and wherein said AB or ABA copolymer has at least 50 percent by weight of said flexible polymer segment therein, and
incorporating said curable block copolymer in a plastic compound as a toughening agent.

19. A process according to claim 18, wherein said saturated polyester B is a polyester made from adipic acid and ethylene glycol, diethylene glycol, or propylene glycol, and wherein said unsaturated anhydride is maleic anhydride and said cyclic alkylene oxide is ethylene oxide or propylene oxide.

20. A process according to claim 18, wherein said block copolymer is said ABA, including curing said curable ABA block copolymer with styrene, wherein the molecular weight of said unsaturated polyester is from about 100 to about 500, wherein said block copolymer has at least 80 percent by weight of said B block therein, wherein said B block is said saturated polyester, wherein said saturated polyester is poly(ethylene adipate), poly(diethylene adipate) or poly(propylene adipate), and wherein said unsaturated polyester is hydroxypropylmaleate or hydroxypropylfumarate, or combinations thereof.

* * * * *